(12) United States Patent
Yao et al.

(10) Patent No.: US 11,676,633 B2
(45) Date of Patent: Jun. 13, 2023

(54) COATED DISK SEPARATOR PLATE, ELECTRONIC DEVICES THAT INCLUDE ONE OR MORE COATED DISK SEPARATOR PLATES, AND RELATED METHODS OF MAKING AND USING

(71) Applicant: Seagate Technology LLC, Fremont, CA (US)

(72) Inventors: Michael Yi Zhao Yao, Shugart (SG); XiaoJin Wu, Wuxi (CN); Bo Shi, Wuxi (CN); May Choo Pang, Shugart (SG)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/242,518

(22) Filed: Apr. 28, 2021

(65) Prior Publication Data

US 2022/0351749 A1 Nov. 3, 2022

(51) Int. Cl.
  *G11B 33/14* (2006.01)
  *G11B 5/73* (2006.01)
  *C23C 18/32* (2006.01)

(52) U.S. Cl.
  CPC .......... *G11B 5/73933* (2019.05); *C23C 18/32* (2013.01); *G11B 33/14* (2013.01); *G11B 33/148* (2013.01); *G11B 33/1453* (2013.01)

(58) Field of Classification Search
  None
  See application file for complete search history.

(56) References Cited

U.S. PATENT DOCUMENTS

| | | | | |
|---|---|---|---|---|
| 5,725,931 A | * | 3/1998 | Landin | F16F 1/376 428/64.2 |
| 5,875,171 A | * | 2/1999 | Albrecht | G11B 5/82 |
| 6,146,735 A | * | 11/2000 | Viggiano | G11B 23/0035 205/90 |
| 6,285,525 B1 | * | 9/2001 | McCutcheon | B32B 27/06 |
| 6,542,328 B2 | | 4/2003 | Harrison et al. | |
| 6,930,857 B1 | | 8/2005 | Lin et al. | |
| 7,081,277 B1 | * | 7/2006 | Watanabe | C23C 14/0605 427/508 |
| 7,256,961 B2 | * | 8/2007 | Chen | G11B 33/121 |
| 7,324,307 B2 | | 1/2008 | Brink et al. | |
| 7,408,739 B2 | * | 8/2008 | Kim | G11B 17/038 |
| 9,263,094 B2 | | 2/2016 | Haidari | |

(Continued)

FOREIGN PATENT DOCUMENTS

CN 103941538 A * 7/2014
EP 1854909 A2 * 11/2007

OTHER PUBLICATIONS

The Journal of Physical Chemistry Letters; "Definitions for Hydrophilicity, Hydrophobicity, and Superhydrophobicity: Getting the Basics Right"; Kock-Yee Law; Feb. 2014.*

(Continued)

*Primary Examiner* — Jefferson A Evans
(74) *Attorney, Agent, or Firm* — Kagan Binder, PLLC

(57) ABSTRACT

The present disclosure relates to disk separator plates that include a coating to increase the water contact angle of the exterior surface of the disk separator plate so as to decrease its wettability. The present disclosure also involves hard disk drives that include such a disk separator plate and related methods of forming such a coating.

17 Claims, 5 Drawing Sheets

(56) References Cited

U.S. PATENT DOCUMENTS

| | | | |
|---|---|---|---|
| 9,530,449 B1 | 12/2016 | Dobosz et al. | |
| 10,262,689 B2 | 4/2019 | How et al. | |
| 10,872,635 B2* | 12/2020 | Takano | G11B 17/021 |
| 2003/0228470 A1* | 12/2003 | Allaire | C09D 5/008 |
| | | | 428/323 |
| 2004/0100725 A1* | 5/2004 | Chen | G11B 17/02 |
| 2007/0012957 A1* | 1/2007 | Dawson | C25B 11/031 |
| | | | 257/249 |
| 2010/0134920 A1* | 6/2010 | Mizumoto | G11B 33/148 |
| 2010/0178422 A1* | 7/2010 | Deeken | G11B 33/1446 |
| | | | 427/203 |
| 2011/0128651 A1* | 6/2011 | Hayakawa | G11B 17/038 |
| 2014/0335371 A1 | 11/2014 | How et al. | |
| 2015/0158244 A1* | 6/2015 | Tibbits | B29C 69/025 |
| | | | 264/479 |
| 2016/0140996 A1 | 5/2016 | How et al. | |
| 2017/0092725 A1* | 3/2017 | Ando | H01L 29/66757 |
| 2019/0077702 A1* | 3/2019 | Chang | B65D 1/40 |
| 2021/0407551 A1* | 12/2021 | Suzuki | G11B 17/038 |
| 2022/0240396 A1* | 7/2022 | Rathinavelu | H05K 5/0213 |

OTHER PUBLICATIONS http://www.uskino.com/articleshow_113.html; KINO Scientific Instrument Inc.; Aug. 2020.*

* cited by examiner

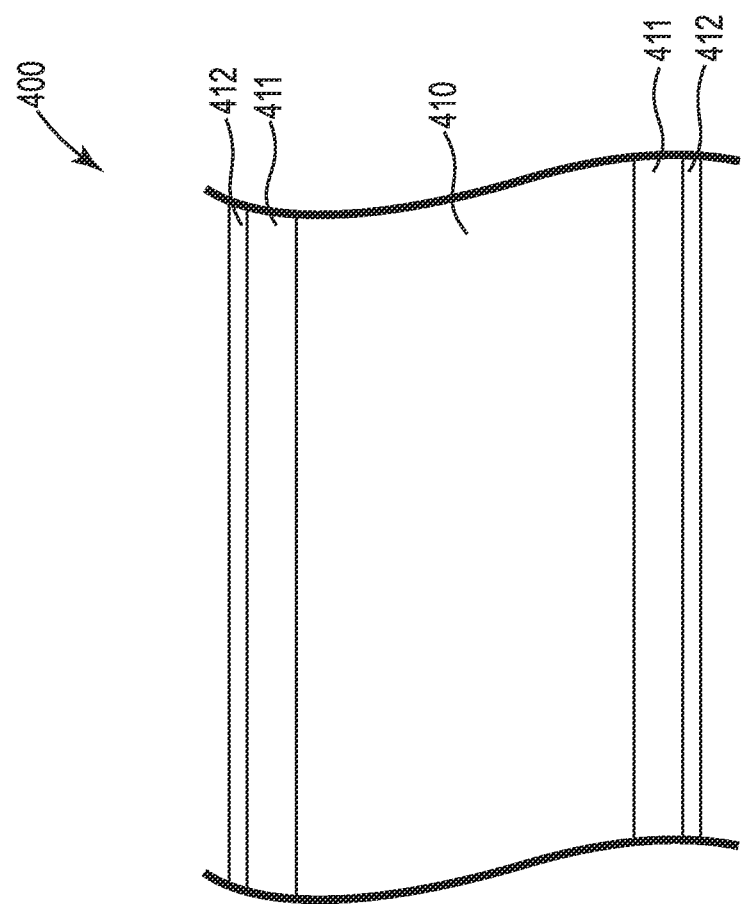

COATED DISK SEPARATOR PLATE, ELECTRONIC DEVICES THAT INCLUDE ONE OR MORE COATED DISK SEPARATOR PLATES, AND RELATED METHODS OF MAKING AND USING

BACKGROUND

The present disclosure relates to one or more disk separator plates used in a hard disk drive. There is a continuing need to solve problems related drive failures related to undue condensation in hard disk drives, e.g., that may involve disk separator plates and adjacent recording media.

SUMMARY

The present disclosure includes embodiments of a coated, disk separator plate. The disk separator plate includes:
  a) a disk separator plate;
  b) an outer coating; and
  c) a surface underlying the outer coating, wherein the surface has a first water contact angle value, wherein the outer coating has a second water contact angle value, wherein the second water contact angle value is greater than the first water contact angle value, and wherein the coated, disk separator plate is adapted to be mounted inside a hard disk drive in a non-movable manner and adjacent to at least one rotatable, recording disk.

The present disclosure includes embodiments of a method of making a coated, disk separator plate. The method includes:
  a) providing a disk separator plate having on outer surface, wherein the outer surface has a first water contact angle value, and wherein the disk separator plate is adapted to be mounted inside a hard disk drive in a non-movable manner and adjacent to at least one rotatable, recording disk; and
  b) applying an outer coating over the outer surface, wherein the outer coating has a second water contact angle value that is greater than the first water contact angle value.

BRIEF DESCRIPTION OF THE DRAWINGS

FIG. 4 shows a partial, cross-section schematic illustrating one non-limiting embodiment according to the present disclosure of a coated, disk separator plate.

DETAILED DESCRIPTION

The present disclosure relates to one or more disk separator plates used in a hard disk drive (HDD). Hard disk drives incorporate disk separator plates in order to reduce airborne noise and/or reduce vibration caused by gas turbulence created by rotating disk media surfaces. While not being bound by theory, it is believed that a stationary disk separator plate positioned between two adjacent rotating disks should cover the disk surfaces in order to reduce these vibration effects. It is believed that the main airflow in a hard disk drive assembly is tangential to the circumferential edge of the rotating disks, which causes vortexes to be created between the airflow fluid layers, thereby causing disk flutter and vibration of the magnetic reading heads during operation, thereby increasing noise and decreasing HDD performance.

Figure 1:
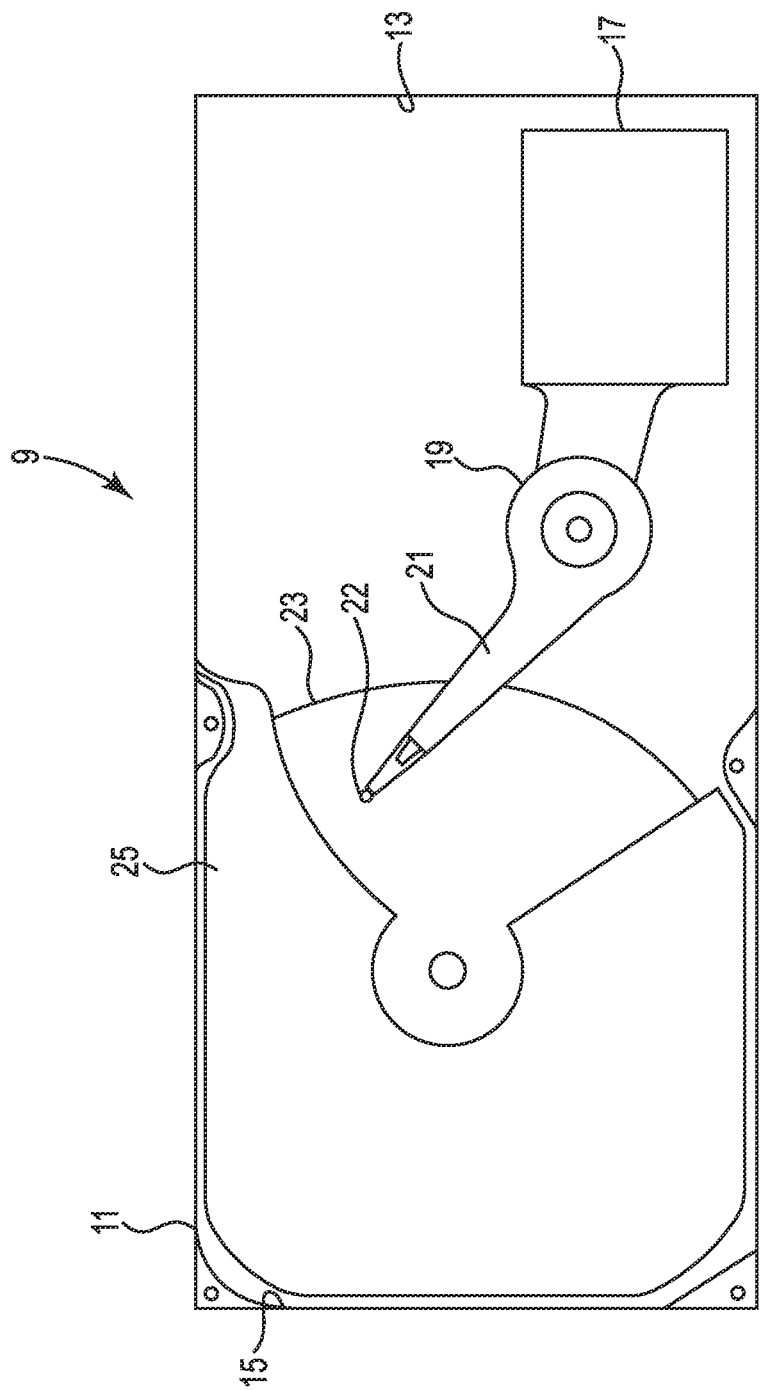
FIG. 1 is an illustration of a top view of a hard disk drive having its top removed and with a disk separator plate located therein.

The use of disk separator plates in hard disk drives is well known. For example, FIG. 1 illustrates an embodiment of the environment in which disk separator plates, also known as air damper plates, are utilized. As shown in FIG. 1, hard disk drive 9 has a housing 11 with side walls 15 and 13, and a top enclosing the housing (not shown). Contained within the housing 11 is an actuator drive assembly 17. An actuator 19, along with actuator arms 21 that carry read/write heads 22 are part of the drive assembly 17. One or more disk separator plates are mounted between each of the disks in the disk stack 23 and that are rotatably mounted in hard disk drive 9. For illustration purposes, as shown in FIG. 1, a disk separator plate 25 can optionally be positioned over the top disk 23 and mounted to the side walls 15 and 13, or in any other convenient manner, to the housing 11 of hard disk drive 9. It is noted that a disk separator plate does not need to be positioned over the top disk in a disk in a disk stack 23. Although disk separator plates generally have a flat, plate-like, cross-sectional profile similar to the rotatable, recording disks 23, disk separator plates are generally less extensive (not co-extensive) with an adjacent recording disk 23. For example, for illustrations purposes, FIG. 1 shows that the major surface of disk separator plate 25 covers only a portion of an adjacent, rotatable, recording disk in disk stack 23. This provides enough space to permit an actuator arm carrying a read/write head such as arm 21 and head 22, respectively, to actuate back from forth during reading and writing operations from an inside diameter to an outside diameter of a disk in disk stack 23 without contacting a disk separator plate.

Figure 2:
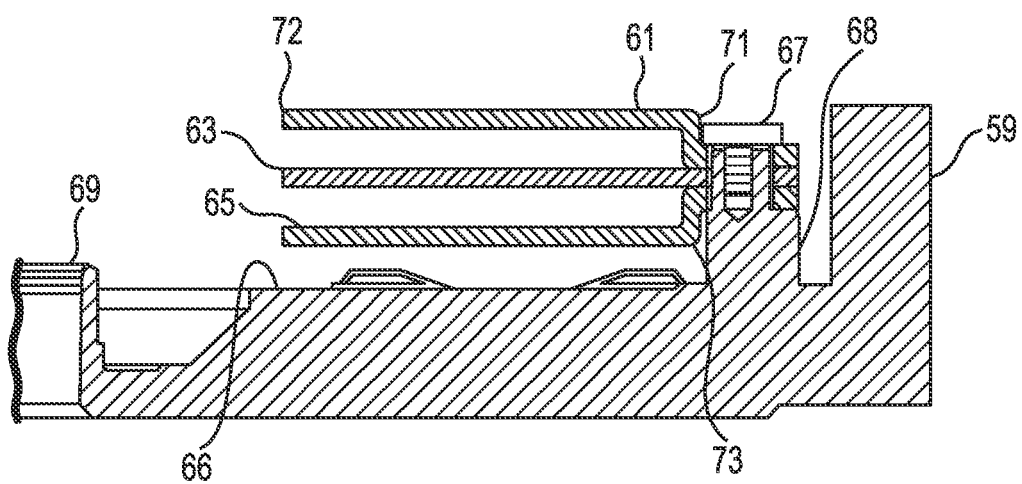
FIG. 2 is a side, partial view of a hard disk drive with disk separator plates mounted therein.

The shape and construction of the disk separator plates are quite varied, although they have a common purpose of reducing airflow induced vibration. Disk separator plates are also adapted to be mounted inside a hard disk drive in a non-movable manner and adjacent to at least one rotatable, recording disk (e.g., disk 23). A non-limiting example of a plurality of disk separator plates mounted in a hard disk drive is illustrated in FIG. 2. As shown in FIG. 2, a stack of separator plates 61, 63, and 65 are attached to a housing 59 of a hard disk drive. In some embodiments, the upper separator plate 61 and the lower separator plate 65 can be made to form an offset between separator plates 61 and 63, 63 and 65, and 65 and the base 66 respectively, by offset forming the ends of the separator plate 61 and 65 a certain distance to create the offset 71 for separator plate 61 and the offset 73 for separator plate 65. The center separator plate 63 is not bent and has no offset. The stack of separator plates 61, 63, and 65, is assembled on a standoff 68 which can be part of the frame 59 of the hard disk drive housing. The stack of separator plates 61, 63, and 65 can fastened in position by any desirable fastening technique such as by a fastening bolt 67. The rotatable recording disks (not shown) that rotate in the spaces between the separator plates 61 and 63, 63 and 65 and 65 and the base 66, can be attached to a rotating spindle 69, in a manner well known.

Non-limiting examples of disk separator plates are described in U.S. Pat. No. 6,542,328 (Harrison et al.); U.S. Pat. No. 6,930,867 (Lin et al.); U.S. Pat. No. 9,263,094 (Haidari); U.S. Pat. No. 9,530,449 (Dobosz et al.); U.S. Pat. No. 10,262,689 (How et al); U.S. Pub. 2014/0335371 (How et al); and U.S. Pub. 2016/0140996 (How et al), wherein the entirety of each of said patent documents is incorporated herein by reference.

A disk separator plate can be made out of a wide variety of materials such as one or more plastics, one or more ceramics, one or more metals, and combinations thereof. In some embodiments, a disk separator plate can be made out of one or more metals. As used herein, "metal" refers to a single metal or alloys thereof. Non-limiting examples of one more metals include aluminum, stainless steel, carbon steel, and mixtures thereof.

A disk separator plate can be made by a wide variety of techniques such as stamping, forging, extruding, die-casting, injection molding, machining, and combinations thereof. Which technique or techniques are selected can depend on one or more factors such as the material that the disk separator plates are made out of.

At least a portion of (substantially all of) an outer surface of a disk separator plate can include one or more coatings to modify one or more properties of the disk separator plate such as to make the separator plate more resistant to corrosion, and the like. Such coatings can be applied by a wide variety of techniques such as electroless plating, electrophoretic painting, electrocoating, combinations of these and the like. A non-limiting example of electroless coating includes electroless, metal plating such as described in U.S. Pat. No. 7,324,307 (Brink et al.), wherein the entirety of said patent is incorporated herein by reference. Non-limiting examples of one or more metals that can be applied to an outer surface of a disk separator plate include nickel, chromium, platinum, palladium, rhodium, gold, silver, and combinations thereof.

A metal-plated coating can have a thickness in the range from 0.1 to 30 micrometers, from 0.5 to 25 micrometers, or even from 1 to 20 micrometers.

The present inventors have observed a problem of drive failures by read/write heads adjacent to disk separator plates, e.g., made using electroless, metal plating to form a thin, outermost layer for anti-corrosion purposes. An example of such a disk separator plate is made by electroless plating an outermost nickel layer to the disk separator plate. While not being bound by theory, it is believed that the wettability and/or thermal conductivity of such a disk separator plate selectively increases the tendency for water vapor (present as humidity inside a hard disk drive) to condense on the disk separator plate as compared to disk separator plates made with other materials.

Figure 3A:
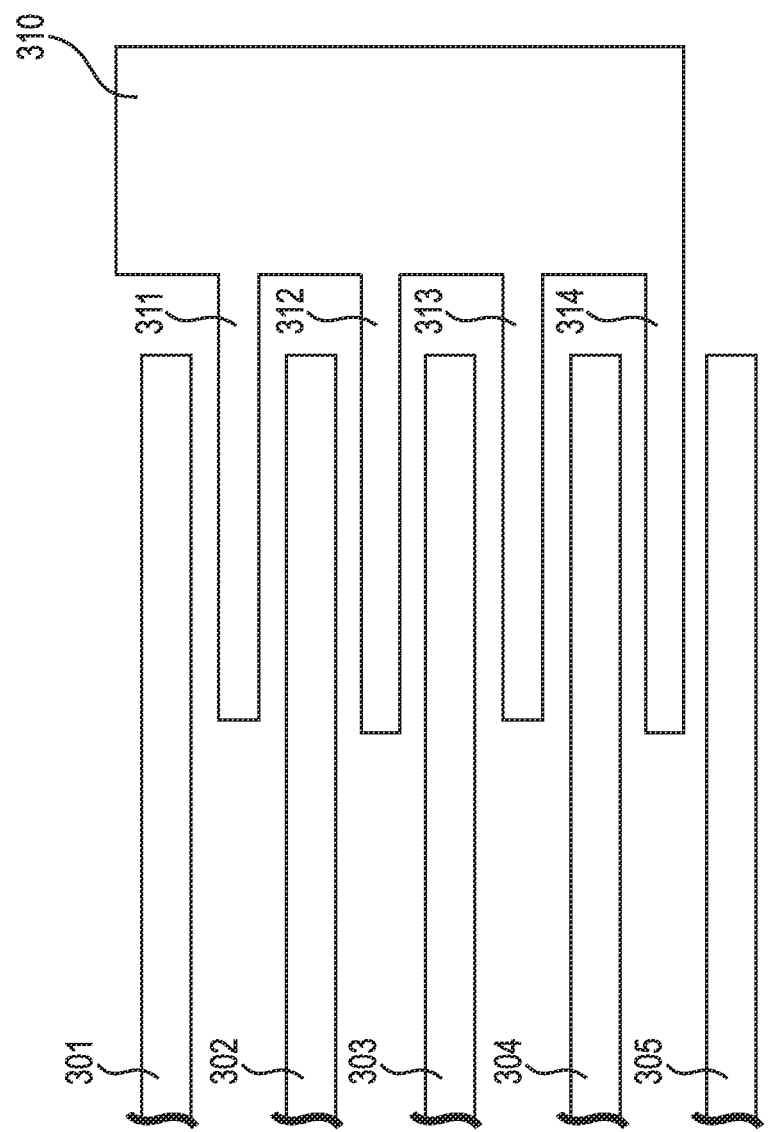
FIG. 3A shows partial, side view schematic showing the relationship of a stack of rotatable, recording disks and a stack of disk separator plates.

With respect to wettability, it is believed that disk separator plates made using electroless, metal plating are relatively more hydrophilic (e.g., as measured by water contact angle ("WCA")) such that those disk separator plates have a relatively lower WCA (higher wettability) and, therefore, have a relatively higher tendency for water vapor to condense on the disk separator plate, e.g., when water vapor reaches a certain concentration at a given temperature. An example of this is illustrated with respect to FIGS. 3A-3C. FIG. 3A shows a partial, side view schematic of a stack of rotatable, recording disks 301, 302, 303, 304, and 305 in relationship to a stack of fixed and static disk separator plates 311, 312, 313, and 314. The distance (gap) between adjacent surfaces of a disk separator plate and a rotatable, recording disk can vary as desired. For example, in some embodiments, the gap between a major surface of a disk separator plate (e.g., top, major surface of disk separator plate 311 and bottom, major surface of rotatable, recording disk 301) can be in the range from 0.05 to 1 millimeters (mm), from 0.2 to 0.9 mm, or even from 0.3 to 0.8 mm). It is noted that the topography of the top, major surface of disk separator plate 311 can vary so the gap referred to is from the outermost surface of the top, major surface of disk separator plate 311. The disk separator plates 311, 312, 313, and 314 are attached to a standoff 310, which can be attached to or mounted inside a hard disk drive in any desirable manner. It is noted that disk separator plates 311, 312, 313, and 314 are shown in FIG. 3A in a simplistic manner for illustration purposes, but that one or more disk separator plates 311, 312, 313, and 314 could be different from the other disk separator plates with respect to the materials the disk separator plates are made out of including any coatings they may have. One or more disk separator plates 311, 312, 313, and 314 could also be independently mounted to standoff 310.

Figure 3B:
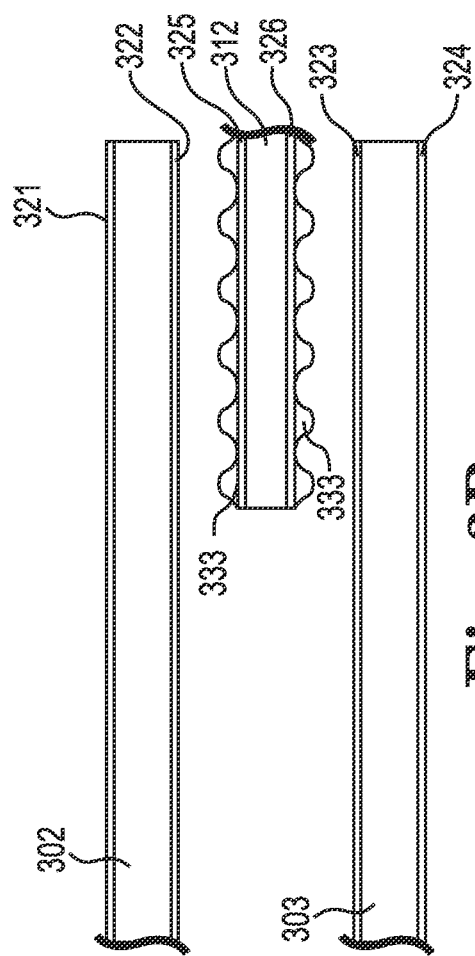
FIG. 3B shows a portion of FIG. 3A after water vapor condenses on one of the separator plates.

In more detail, FIG. 3B shows that rotatable, recording disk 302 has a layer 321 of media lube on one side and a layer 322 of media lube on the opposite side. Likewise, rotatable, recording disk 303 has a layer 323 of media lube on one side and a layer 324 of media lube on the opposite side. Disk separator plate 312 has layers 325 and 326 of metal (e.g., nickel) plating to prevent undue corrosion. As the relative humidity increases and/or as internal hard disk drive temperature (and therefore the external surfaces of a disk separator plate) decreases water vapor can condense to form liquid water 333 on one or both sides of disk separator plate. Relative humidity can increase inside a drive due to a variety reasons. Temperatures can fluctuate from the steady state interior temperature of a hard disk drive during operation from about 30 to 65° C., down to non-operating temperature such as room temperature (e.g., about 20-25° C.) or even lower temperatures when a hard disk drive is transported or stored at temperatures that are less than 20° C.

Figure 3C:
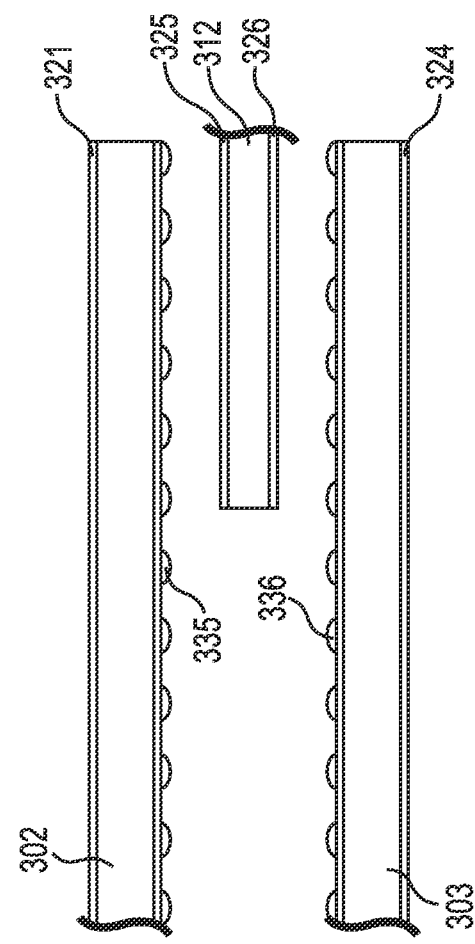
FIG. 3C shows FIG. 3B after condensed water transfers to adjacent surfaces of rotatable, recording disks.

As shown in FIG. 3C, water condensation 333 can transfer to at least the lower side of disk separator plate 302 and/or the upper side of disk separator plate 303. When the condensation interacts with the layer 322 of media lube and/or the layer 323 of media lube, the media lube can become more mobile and tend to form ripples 335 and 336. Ripples 335 and 336 can interact with read/write heads to an undue degree such as causing one or more of modulation, read/write failures, combinations of these, and the like.

The present disclosure solves the problem of undue condensations encountered at conditions of operating a hard disk drive by, e.g., increasing the water contact angle of the outermost surface of a disk separator plate, thereby reducing its wettability and the tendency of water vapor to condense.

As used herein, "water contact angle" is the angle measured through the liquid, where a liquid-vapor interface meets a solid surface and is quantified via the Young equation as follows:

$$\gamma sv - \gamma sl = \gamma lv \cos \theta;$$

where
  $\gamma lv$ is the surface tension at the interface of the liquid and vapor phases,
  $\gamma sl$ is the surface tension at the interface of the solid and liquid phases, and
  $\gamma sv$ is the surface tension at the interface of the solid and vapor phases.

A given system of solid, liquid, and vapor at a given temperature and pressure has a unique water contact angle. The water contact angle can depend on the medium above the free surface of the liquid (e.g., gas such as helium, oxygen, air, and mixtures thereof), and the nature of the liquid and solid in contact.

Water contact angle can be measured using a variety of methods. For example, water contact angle can be measured by dropping a small drop of pure deionized (DI) water on the surface to be tested. Then," the contact angle of that the drop forms with the surface is measured. Typically, testing is performed at room temperature. Water contact value can be determined according to ASTM D7334-08(2013) (Standard Practice for Surface Wettability of Coatings, Substrates and Pigments by Advancing Contact Angle Measurement"), which provides the protocol for water contact angle measurement.

In some embodiments, the water contact angle of a disk separator plate can be increased by modifying the surface of the disk separator plate to change the surface tension between the exterior surface of the disk separator plate and the condensed water and/or the surface tension between the exterior surface of the disk separator plate and the vapor. For example, a the water contact angle of an outer most surface of a disk separator plate can be increased by applying at least a partial coating (e.g., full surface coating) chosen from an organic coating and/or a hydrophobic coating to the outermost surface of the disk separator plate to form a coated disk separator plate and increase the water contact angle of the coated disk separator plate.

A non-limiting example of such a coated disk separator plate is illustrate in FIG. 4. As shown in FIG. 4, a coated, disk separator plate 400 includes a disk separator plate 410 (e.g., made out of aluminum or stainless steel), metal-plated (e.g., nickel-plated) coatings 411 on the top and bottom of disk separator plate 410, and a coating 412 to increase the water contact angle of the coated, disk separator plate 400 as compared to the disk separator plate 410 and coating 411 without the coating 412.

The thickness of uncoated, disk separator plate 410 can vary as desired. Non-limiting examples of thickness of uncoated, disk separator plate 410 include from 0.1 to 3 millimeters (mm), from 0.5 to 2.5 mm, or even from 0.75 mm to 2.0 mm.

The coating 411 can include one or more layers. In some embodiments, each layer in coating 411 can include one or more metals such as metal-plated (e.g., nickel-plated) layers. In some embodiments, the coating 411 can have a water contact angle value that is 50 degrees or less, 45 degrees or less, 40 degrees or less, 35 degrees or less, 30 degrees or less, 25 degrees or less, or even 20 degrees or less. In some embodiments, the coating 411 can have a water contact angle value that is from 10 to 45 degrees, or even from 15 to 40 degrees.

The coating 412 can include one or more layers. In some embodiments, each layer can include an organic coating and/or a hydrophobic coating that provide a desired water contact angle value as described herein.

Non-limiting examples of a coating 412 includes a coating made out of one or more fluoropolymers. Non-limiting examples of fluoropolymers include polyvinylfluoride (PVF), polyvinylidene fluoride (PVDF), polytetrafluoroethylene (PTFE), polychlorotrifluoroethylene (PCTFE), perfluoroalkoxy polymer (PFA), fluorinated ethylene-propylene (FEP), perfluorinated compound (PFC), fluorochloroalkene, polyethylenetetrafluoroethylene (ETFE), polyethylenechlorotrifluoroethylene (ECTFE), fluoroelastomer [tetrafluoroethylene-Propylene] (FEPM), perfluoropolyether (PFPE), fluoroelastomer (FKM), perfluoroelastomer (FFKM), and combinations thereof.

Fluoroelelastomers ("FKM") are defined by ASTM D1418 and ISO 1629 (first ed. 1995 and ed. 2013). Such FKM materials may also be referred to as fluorine rubber or fluoro-rubber. FKM materials are derived from monomers that include vinylidene fluoride and can be divided into different classes on the basis of either chemical composition, fluorine content, or cross-linking mechanism. Non-liming examples of fluorocarbon-based fluoroelastomers that are based on their chemical composition include one or more of Type-1 FKMs, Type-2 FKMs, Type-3 FKMs, Type-4 FKMs, and Type-5 FKMS. Type-1 FKMs include vinylidene fluoride (VDF) and hexafluoropropylene (HFP). Type-2 FKMs include VDF, HFP, and tetrafluoroethylene (TFE). Type-3 FKMs include VDF, TFE, and perfluoromethylvinylether (PMVE). The addition of PMVE can improve low temperature flexibility. Type-4 FKMs include propylene, TFE, and VDF. Type-5 FKMs include ethylene, VDF, HFP, TFE, and PMVE.

Additional non-limiting examples of a coating 412 include a coating made out of one or more hydrophobic materials. Non-limiting examples of hydrophobic coatings 412 include what are referred to as "superhydrophobic coatings," which can be formulated to repel water to a desired degree. In some embodiments, superhydrophobic coatings can be composite materials made from a component that provides "roughness" and another component that provides low surface energy. A wide variety of materials can be used to form superhydrophobic coatings, including organic materials and/or hybrid inorganic-organic materials. Non-limiting examples of materials used to form superhydrophobic coatings include one or more of manganese oxide polystyrene, zinc oxide polystyrene, precipitated calcium carbonate, fluorinated silanes, thiols (mercaptans), combinations of these, and the like. Additional non-limiting examples of a hydrophobic materials for making coating 412 include one or more polyurethane materials.

In some embodiments, coating 412 can include one or more self-assembled monolayers (SAMs). The terms "self-assembled monolayer" and "SAM" as used herein refer to a thin monolayer coating wherein surface-active molecules present in a reaction solution can be provided (e.g., adsorbed) on a surface (e.g., a metal-coated disk separator surface) to produce chemical bonds therebetween. A SAM coating can be selected to have hydrophobic properties to help repel water. Exemplary SAM coatings can be made from organic material, preferably a halogenated polymer such as a fluoropolymer. In some embodiments, a functional group is chosen from a fluorocarbon (e.g., a perfluorocarbon), an alkane, an amine, a silicon oxide, other metal oxides, and combinations thereof. For example, in some embodiments, the organic material includes an organosilane (e.g. alkyl trichlorosilane, fluorinated alkyl trichlorosilane, alkyl trialkyloxysilane, fluorinated alkyl trialkyloxysilane, per-fluoro-decyl-trichlorosilane (FDTS), etc.).

Techniques for applying a SAM to at least a portion of a disk separator plate include forming a SAM coating from a vapor phase or a liquid phase. For example, a SAM may be deposited on a surface of a disk separator plate in a vacuum chamber using a plasma source, such as, for example, a radio-frequency inductive plasma source, a radio-frequency capacitive plasma source, a DC arc plasma source, a hollow cathode plasma source, microwave plasma source or an electron cyclotron resonance (ECR) plasma source.

A self-assembled monolayer is typically formed using a precursor compound. A precursor compound for forming the self-assembled monolayer or SAM typically includes molecules having a head group, a tail, and functional end group.

Common head groups include thiols, silanes, etc. SAMs can be created by chemisorption of the head groups onto the substrate material from either a vapor or liquid phase, by processes such as immersion or dip coating, spraying, chemical vapor deposition (CVD), micro-contact printing, dip-pen nanolithography, etc. The head groups closely assemble on the material with the tail groups extending away from the material.

If deposited from a liquid phase, the precursor compound of the SAM may be present in any conventionally-used organic solvent, water, or any mixture thereof. Examples of suitable organic solvents may include, but are not limited to, alcohols (e.g., methyl alcohol, ethyl alcohol, n-propyl alcohol, isopropyl alcohol, n-butyl alcohol, sec-butyl alcohol, t-butyl alcohol, isobutyl alcohol, and diacetone alcohol); ketones (e.g., acetone, methylethylketone, methylisobutylketone); glycols (e.g., ethyleneglycol, diethyleneglycol, triethyleneglycol, propyleneglycol, butyleneglycol, hexyleneglycol, 1,3-propanediol, 1,4-butanediol, 1,2,4-butantriol, 1,5-pentanediol, 1,2-hexanediol, 1,6-haxanediol); glycol ethers (e.g., ethyleneglycol dimethyl ether, and triethyleneglycol diethyl ether); glycol ether acetates (e.g., propylene glycol monomethyl ether acetate (PGMEA)); acetates (e.g., ethylacetate, butoxyethoxy ethyl acetate, butyl carbitol acetate (BCA), dihydroterpineol acetate (DHTA)); terpineols (e.g., trimethyl pentanediol monoisobutyrate (TEXANOL)); dichloroethene (DCE); chlorobenzene; and N-methyl-2-pyrrolidone (NMP).

The concentration of the precursor compound in the solution may be determined by those skilled in the art according to the intended applications and purposes and may be in the range of about 5 to about 20 mM. An immersion step may be performed without particular limitation and may be carried out at room temperature for about 20 to 80 minutes. Similarly, other methods may be carried out by conventional means.

Coating 412 may include one or more additives that help prevent undue condensation of water vapor (e.g., help provide desired hydrophobicity and/or water contact angle). For example, one or more additives can be included in coating 412 to modify (e.g., increase) the water contact angle value of coating 412. One non-limiting example of such additives includes particles (e.g., nanoparticles) having a size to provide a coating 412 thickness as described herein and that are made out of organic material and/or hydrophobic material (including such materials as described herein above with respect to coating 412).

In some embodiments, the coating 412 can have a water contact angle value that is greater than 50 degrees, 55 degrees, greater than 60 degrees, greater than 65 degrees, greater than 70 degrees, greater than 75 degrees, greater than 80 degrees, greater than 85 degrees, greater than 90 degrees, greater than 95 degrees, greater than 95 degrees, greater than 100 degrees, greater than 110 degrees, greater than 120 degrees, or even greater than 150 degrees. In some embodiments, the coating 411 can have a water contact angle value that is from 55 to 150 degrees, from 60 to 120 degrees, or even from 60 to 100 degrees.

Coating 412 can be applied using any desired technique. In some embodiments, a solution can be applied to the coating 411, followed by allowing the solvent in the solution to evaporate to form coating 412. Non-limiting examples of applying a solution include spraying, dipping, and combinations thereof. In some embodiments, the solution can include a solute and a solvent. The solute can be chosen from an organic material, a hydrophobic material, and combinations thereof. The solvent can include an organic solvent, an aqueous solvent, and mixtures thereof.

A non-limiting example of a solution used according to the present disclosure includes dissolving an amount of an FKM in acetone so that the solution can be applied (deposited) by spraying and/or dipping. A wide variety of amounts of FKM can be used. For example, from 0.1 to 5 percent by weight of the total solution, from 0.2 to 4 percent by weight of the total solution, or even from 0.5 to 2 percent by weight of the total solution.

Forming a coating 412 can include one or more steps in addition to depositing material onto a surface such as drying, curing, etc., and combinations thereof. For example, after applying the solution of FKM mentioned above, the solution can be exposed to conditions to evaporate the acetone and form a coated, disk separator plate. In some embodiments, the solution can be exposed to heated condition such as in an oven at a temperature in the range from 100° C. to 280° C.

Coating 412 can have any desired thickness that provides a disk separator plate with a relatively lower water contact angle as compared to, e.g., a disk separator plate with a nickel-plated coating. In some embodiments, coating 412 can have a thickness in the range from greater than 0 to 50 nanometers such as less than 40 nanometers, less than 30 nanometers, less than 20 nanometers, or even less than 10 nanometers (e.g., from 0.5 to 10 nanometers). Coating 412 can be as thin as desired while still providing desired hydrophobic properties. For illustration purposes, a SAM coating 412 (discussed above) can have a thickness in the range from greater than zero to 100 angstroms, but may be thinner or thicker depending on the chemistry used for the SAM coating. In one embodiment, a SAM coating 412 can have a thickness in the range of from 1 angstrom to 50 angstroms. In another embodiment, a SAM coating can have a thickness in the range of from 1 angstrom to 20 angstroms.

What is claimed is:

1. A hard disk drive comprising:
   a) a plurality of recording disks rotatably mounted on a spindle motor in the hard disk drive, wherein each recording disk has two major surfaces that are opposite to each other;
   b) at least one coated, disk separator plate mounted to a fixture in a non-movable manner, wherein the at least one coated disk separator plate has two major surfaces that are opposite to each other, and wherein the coated, disk separator plate comprises:
      a disk separator plate;
      at least a first coating over the disk separator plate, wherein the first coating comprises a metal-plated coating; and
      an outer coating over the first coating, wherein the first coating has a surface underlying the outer coating, wherein the surface has a first water contact angle value, wherein the outer coating has a second water contact angle value, wherein the second water contact angle value is greater than the first water contact angle value, and wherein the coated, disk separator plate is positioned relative to one or more of the recording disks in an adjacent manner so that a gap is present between a major surface of the coated, disk separator plate and an adjacent major surface of the adjacent recording disk.

2. The hard disk drive of claim 1, wherein the first water contact angle value is 50 degrees or less, and wherein the second water contact value is greater than 50 degrees.

3. The hard disk drive of claim 1, wherein the first water contact angle value is 40 degrees or less, and wherein the second water contact value is greater than 85 degrees.

4. The hard disk drive of claim 1, wherein the outer coating comprises one or more layers, and wherein each of the one or more layers comprises a material chosen from an organic material, a hydrophobic material, and combinations thereof.

5. The hard disk drive of claim 4, wherein at least one of the one or more layers in the outer coating comprises one or more fluoropolymers.

6. The hard disk drive of claim 5, wherein the one or more fluoropolymers are chosen from polyvinylfluoride (PVF), polyvinylidene fluoride (PVDF), polytetrafluoroethylene (PTFE), polychlorotrifluoroethylene (PCTFE), perfluoroalkoxy polymer (PFA), fluorinated ethylene-propylene (FEP), perfluorinated compound (PFC), fluorochloroalkene, polyethylenetetrafluoroethylene (ETFE), polyethylenechlorotrifluoroethylene (ECTFE), fluoroelastomer [tetrafluoroethylene-Propylene] (FEPM), perfluoropolyether (PFPE), fluoroelastomer (FKM), perfluoroelastomer (FFKM), and combinations thereof.

7. The hard disk drive of claim 1, wherein the outer coating has a thickness from greater than 0 to 10 nanometers.

8. The hard disk drive of claim 1, wherein the disk separator plate comprises one or more metals.

9. The hard disk drive of claim 1, wherein the disk separator plate comprises aluminum, stainless steel, carbon steel, and combinations thereof.

10. The hard disk drive of claim 1, wherein the first coating comprises one or more layers, and wherein each of the one or more layers comprises one or more metals.

11. The hard disk drive of claim 10, wherein the one or more metals are chosen from nickel, chromium, platinum, palladium, rhodium, gold, silver, and combinations thereof.

12. The hard disk drive of claim 1, wherein the first coating has a thickness in the range from 0.1 to 30 micrometers.

13. The hard disk drive of claim 1, wherein the at least one coated, disk separator plate comprises a plurality of coated, disk separator plates arranged in a stack and mounted to the fixture in a non-movable manner, wherein adjacent coated, disk separator plates are separated from each other by a gap, wherein each coated disk separator plate has two major surfaces that are opposite to each other, and wherein each coated, disk separator plate comprises:

a disk separator plate;

at least a first coating over the disk separator plate, wherein the first coating comprises a metal-plated coating; and an outer coating over the first coating, wherein the first coating has a surface underlying the outer coating, wherein the surface has a first water contact angle value, wherein the outer coating has a second water contact angle value, wherein the second water contact angle value is greater than the first water contact angle value, and wherein each coated, disk separator plate is positioned relative to one or more of the recording disks in an adjacent manner so that a gap is present between a major surface of the coated, disk separator plate and an adjacent major surface of the adjacent recording disk.

14. The hard disk drive of claim 1, wherein the outer coating comprises one or more layers, and wherein each of the one or more layers comprise a material chosen from manganese oxide polystyrene, zinc oxide polystyrene, precipitated calcium carbonate, fluorinated silanes, thiols (mercaptans), combinations of these.

15. The hard disk drive of claim 1, wherein the outer coating comprises one or more layers, and wherein each of the one or more layers comprise a material chosen from one or more polyurethane materials.

16. The hard disk drive of claim 1, wherein the outer coating comprises one or more layers, and wherein at least one layer is a self-assembled monolayer.

17. The hard disk drive of claim 16, wherein at least one self-assembled monolayer comprises an organosilane material.

* * * * *